May 19, 1953  A. STADLER  2,638,928
AUTOMATIC VALVE CONTROL MEANS RESPONSIVE TO FAILURE
OF EITHER OF TWO SOURCES OF FLUID PRESSURE
Filed Sept. 27, 1947  2 Sheets-Sheet 2
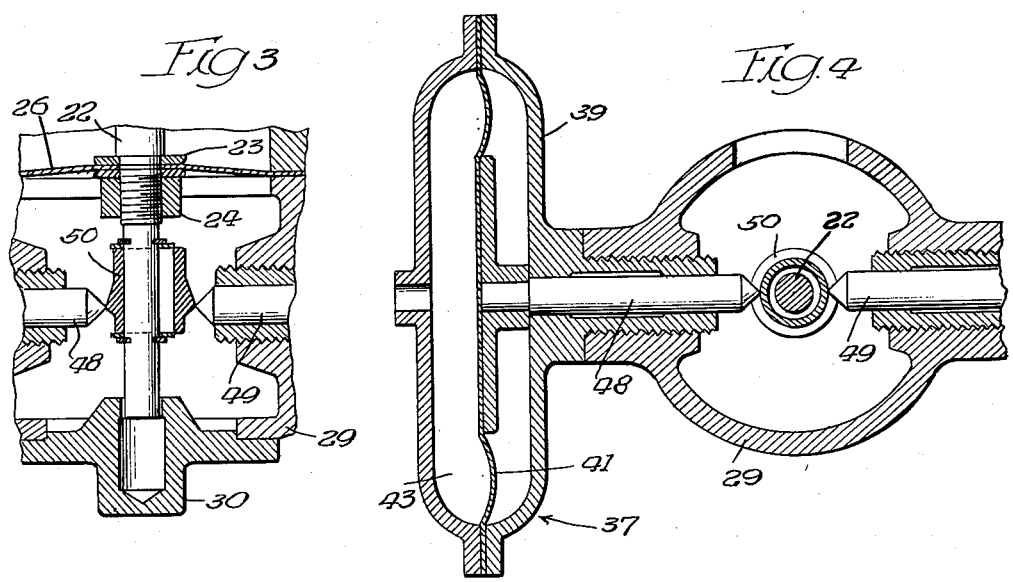
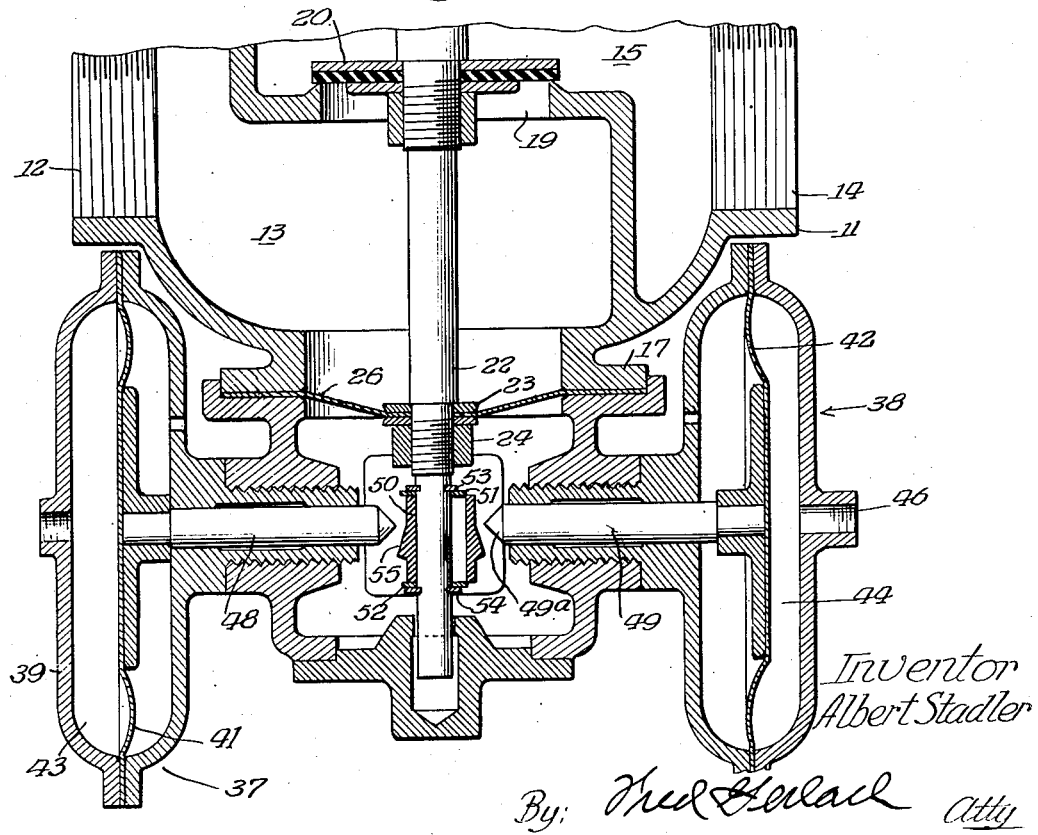
Inventor
Albert Stadler
By: Fred Gerlach Atty Patented May 19, 1953

2,638,928

UNITED STATES PATENT OFFICE 2,638,928

AUTOMATIC VALVE CONTROL MEANS RESPONSIVE TO FAILURE OF EITHER OF TWO SOURCES OF FLUID PRESSURE

Albert Stadler, Rockford, Ill., assignor to Eclipse Fuel Engineering Co., Rockford, Ill., a corporation of Illinois Application September 27, 1947, Serial No. 776,533

6 Claims. (Cl. 137—698)

This invention relates to automatic control devices and improved latch mechanisms and has to do more specifically with a mechanism which is operative automatically to close a fluid-fuel supply valve in response to an abnormal or excessive reduction of pressure either in the fuel supply or the air supply, the invention being particularly applicable to a gas burner installation wherein an air and gas mixture is supplied to the burner under pressure and wherein a failure of either the supply of air under pressure or the supply of gas under pressure could give rise to a hazardous or otherwise objectionable situation if the gas supply line were not immediately closed.

The subject invention can be embodied as a device or combination of devices exclusive of the shut-off valve which it is designed to control, or it may include the valve as an integral part of an entire unit. I prefer, as a matter of convenience, to incorporate the valve in the same structure with the control device whenever it is practicable to do so; but it will become apparent as the description proceeds that there may be instances where it is more feasible to construct the control valve as a separate unit which is adapted to be suitably connected to the valve. I have elected to show in the accompanying drawings only the preferred arrangement wherein the valve forms an integral part of a self-contained unit; but those skilled in the art will readily apprehend that the novel control mechanism can be applied to a separate valve.

My primary object is to provide a reliable device which will operate automatically and promptly to close a fluid-fuel supply valve upon failure of either gas or air pressure.

Another object is to provide a novel latch mechanism wherein effective latching is dependent upon the conjoint action of two latch bolts or equivalent elements and which will release a latched member in response to retraction or deactuation of either of the two latch bolts.

The mechanism of the present invention, as herein specifically described and illustrated in the drawings, is characterized by the provision of a sleeve or equivalent element mounted on the stem of a valve (or extension thereof) and movable axially with said stem while at the same time being freely movable to a limited extent laterally of the stem. Two fluid-pressure-actuated devices (one energized by gas pressure and the other by air pressure) are arranged to act conjointly upon said sleeve and are effective so long as both remain fully energized to lock the valve open. De-energization of either of said fluid-pressure-actuated devices resulting from a failure of either gas or air pressure causes a latch bolt thereof to retract and disengage the aforementioned sleeve and thereby allows the sleeve to move laterally of the valve stem to a sufficient extent to clear the latch bolt of the other device, whereupon the valve stem and sleeve are free to move axially to closed-valve position.

My novel latch mechanism is susceptible of wide variation in design as will become apparent from a consideration of the involved underlying principle of operation; and it also is capable of many possible useful applications in addition to the one herein described.

In the drawings which accompany this specification:

Fig. 2 is a fragmentary sectional view showing the valve closed and one of the pressure-actuated devices de-energized as a result of a pressure failure;

Fig. 3 is a fragmentary sectional view showing how the valve-locking sleeve moves laterally to clear the two latch bolts when one only of the latch bolts has been retracted as a result of a pressure failure; and Fig. 4 is a fragmentary section taken on the line 3—3 of Fig. 1.

Figure 1:
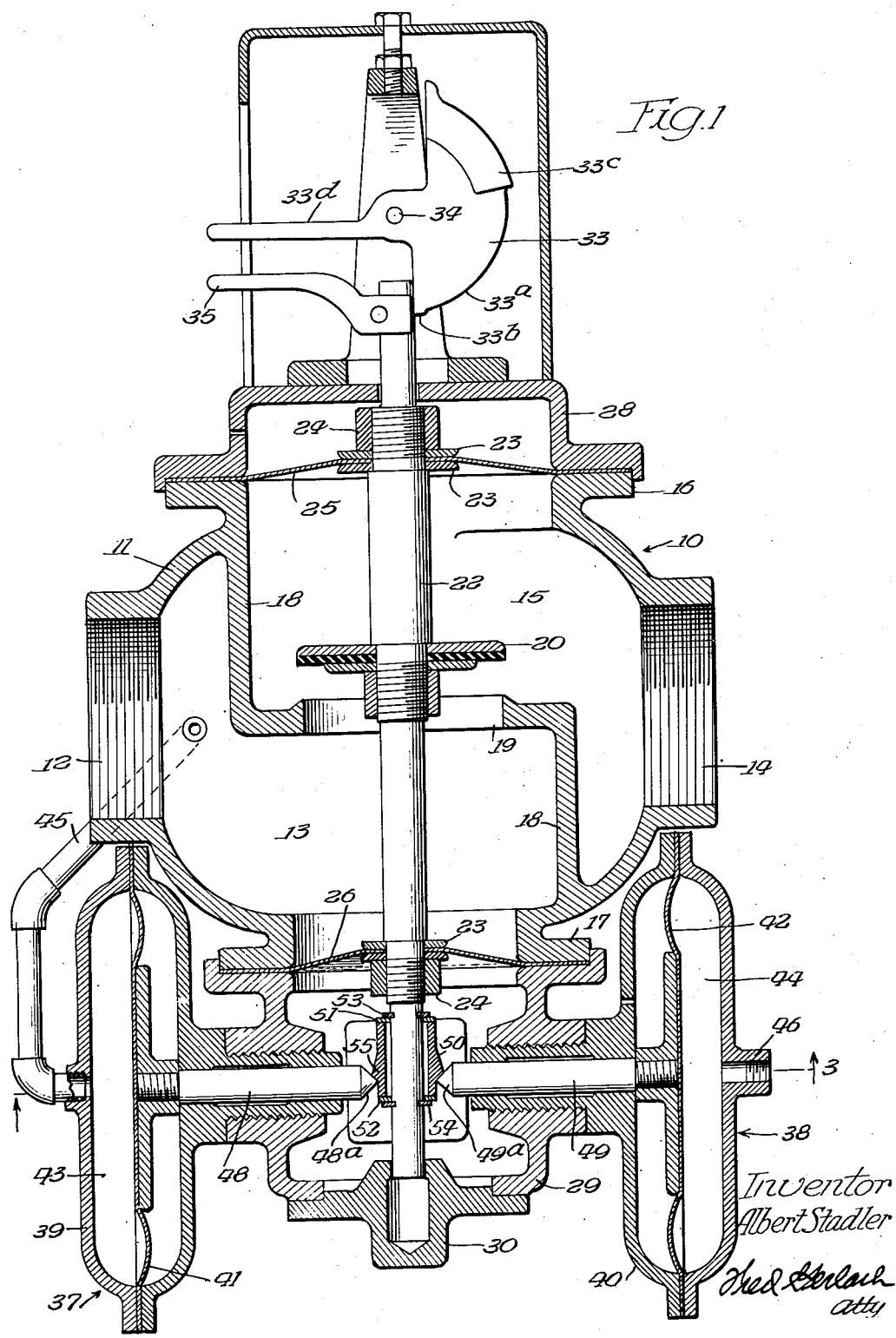
Fig. 1 is a vertical sectional view showing a gas shut-off valve equipped with a control device in accordance with the subject invention, the valve being here shown open.

The shut-off valve per se is of the globe type and is identified as a whole by the reference numeral 10. It comprises a body casting 11 having an inlet opening 12 leading into a chamber 13, an outlet opening 14 connecting with a chamber 15, an upper flange 16 and a lower flange 17. The two chambers 13 and 15 are separated by a wall 18 having a valve port 19 which is adapted to be closed by a valve disc 20 carried by an axially reciprocable valve stem 22, said disc being shown in open position in Fig. 1 and in closed position in Fig. 2.

Valve stem 22 is connected by means of washers 23 and nuts 24 to an upper diaphragm 25 and a lower diaphragm 26 which are sufficiently flexible to permit longitudinal movement of the valve stem from open to closed position and vice versa. The upper diaphragm is clamped along its peripheral margin between the upper flange 16 and the complementary flange of a casting 28; and the lower diaphragm 26 is similarly clamped between the lower flange 17 and a casting 29, to the lower surface of which is secured a flanged bearing 30 which is bored to receive and to function as a guide for the lower end of valve stem 22.

Mounted on casting 28 is a yoke 32 serving as a support for a rotary latch member 33 which is pivoted at 34 and comprises a cam surface 33a, a radial protuberance 33b, a counterweight 33c, and a handle 33d. The function of rotary latch member 33 is to tightly close the shut-off valve following automatic closure thereof—which latter may not close the valve tightly enough to ensure against leakage. Whenever the valve stem 22 moves downwardly from the open position in which it is shown in Fig. 1 to a sufficient extent to clear the protuberance 33b, the latch 33 will rotate by virtue of counterweight 33c in a clockwise direction, as viewed in Fig. 1, and cam surface 33a will thereupon engage and press downwardly upon the top surface of the valve stem, thus forcing valve disc 20 against its seat.

To reset the valve to open position the rotary latch 33 is turned manually by means of handle 33d to the position in which it is shown in Fig. 1, and the valve stem is then manually lifted by means of a handle 35 attached to the upper end thereof. However, the valve cannot thus be reset and caused to remain open unless there obtains both normal gas pressure and normal air pressure as presently will be explained.

Two fluid-pressure-actuated devices 37 and 38 are detachably secured to and carried at opposite sides of casting 29. These comprise casings 39 and 40 within which are mounted flexible diaphragms 41 and 42 forming pressure chambers 43 and 44—the former of which is connected via a pipe 45 with valve chamber 13. Chamber 44 is connected by way of inlet opening 46 with a source of air-under-pressure which is to be mixed with the gas flowing through the shut-off valve.

Two longitudinally aligned and slidable latch bolts 48 and 49 are connected respectively to diaphragms 41 and 42 and are reciprocable axially in response to axiswise displacements of their diaphragms; and said latch bolts have the inner ends thereof tapered at 48a and 49a to provide sloping surfaces for engagement with a latch element in the form of a sleeve 50 which encircles valve stem 22 and is held against movement axially of said stem by a pair of washers 51 and 52 which, in turn, are locked in place by a pair of spring rings 53 and 54 seated in grooves cut in the valve stem.

Sleeve 50 has a bore which is considerably larger in diameter than the portion of valve stem 22 which passes therethrough, and said sleeve is fitted loosely between washers 51 and 52 so that it is free to move laterally to the extent permitted by its bore diameter, except insofar as it is restrained against such movement by the two latch bolts. The exterior of sleeve 50 is formed with an encircling annular ridge 55 which is defined by two outwardly convergent sloping surfaces, the lower of which rests upon the tapered ends 48a and 49a of the two latch bolts when the valve is open, as illustrated in Fig. 1.

When there is normal gas pressure in chamber 43 and normal air pressure in chamber 44 the two diaphragms 41 and 42 are so displaced axiswise by the applied pressure that they hold their respective latch bolts in fully extended posture, as depicted in Fig. 1; and when thus positioned the tapered ends of the latch bolts underlie the annular ridge 55, provided the valve stem is up, as shown in Fig. 1. The axially directed pressure exerted on the two latch bolts is sufficient to more than counteract the opposing force resulting from the weight of the valve stem and thus sufficient to keep the valve open as long as both gas and air pressures remain normal or higher.

The movement of each latch bolt toward the valve stem is so limited that the two latch bolts are equidistant at their adjacent ends from the axis of the valve stem when both latch bolts are fully extended, as clearly shown in Fig. 1; and when either latch bolt is retracted as a result of a pressure failure in its associated pressure chamber, the sleeve 50 is free to move laterally, as illustrated in Fig. 3, to a sufficient extent to clear the point of the other latch bolt while at the same time clearing the point of the retracted latch bolt.

Irrespective of which latch bolt may be retracted as a result of a pressure failure the sleeve 50 will move laterally in the appropriate direction until it clears both latch bolts, and thereupon the valve will close.

Figs. 2 and 3 have been drawn with the assumption that the air pressure has failed, and that the diaphragm 41 has, in consequence, returned to its normal configuration, causing latch bolt 49 to be retracted; but the same ultimate result would follow a retraction of latch bolt 48 consequent upon a failure of gas pressure.

While I have illustrated and described only a preferred embodiment of this invention, it will be apparent that there are numerous possible modifications within the scope and purview thereof, and, accordingly, I do not wish to be limited otherwise than as indicated by the terms of the appended claims.

Having described my invention, what I claim as new and wish to secure by Letters Patent is:

1. In combination, two oppositely positioned spaced apart latch bolts mounted to move to and from one another, each having an inner latching position and an outer retracted position, and an element disposed between the two latch bolts and mounted so that it is movable bodily back and forth in a given path at right angles to the latch bolts and also rectilinearly back and forth in a plane that is normal to the path, said element being adapted to be latched against movement in said path by said latch bolts conjointly, each of said latch bolts being operative when in latching position to hold said element in a position wherein it is latchingly engageable by the other latch bolt provided the last-mentioned latch bolt is also in latching position, each of said latch bolts being operative when the other is retracted, but not otherwise, to move said element rectilinearly in said plane to a position wherein it is not latchingly engageable by either latch bolt, the arrangement being such that a retraction of either latch bolt will unlatch said element.

2. Mechanism comprising a shaft which is reciprocable axiswise, a latching element carried by said shaft and movable axiswise therewith, a pair of latch bolts disposed at opposite sides of said shaft and slidable axiswise toward and away from said shaft, means for imparting axiswise movement to said latch bolts individually and independently, said latch bolts being operative conjointly when fully slid toward said shaft into a latched position to engage said latching element and thereby lock said shaft against axiswise movement in one direction, said element being mounted on said shaft so that it is movable bodily and rectilinearly at right angles thereto in order to escape one of said latch bolts when the other latch bolt is retracted.

3. Mechanism comprising a shaft which is reciprocable axiswise, a latching element carried by said shaft and movable axiswise therewith, said latching element being also movable bodily and rectilinearly in a plane at right angles to the axis of said shaft, a pair of latch bolts disposed at opposite sides of said shaft and having their axes at right angles to the axis of said shaft, said latch bolts being movable axiswise toward said shaft to latching positions substantially equidistant from the axis of said shaft and operative conjointly when in their latching positions to engage said element and prevent axiswise movement of said shaft in one direction, each of said latch bolts having an integral camming surface which engages said element and is effective to deflect said element laterally in said plane when the other latch bolt is retracted, the arrangement being such that whenever one of said latch bolts is retracted sufficiently to clear said element the latter is deflected laterally to the extent necessary to clear the other latch bolt and release the shaft for axiswise displacement.

4. Mechanism comprising a shaft which is reciprocable axiswise, a sleeve carried by and encircling said shaft and movable axiswise therewith, said sleeve having a bore larger than the diameter of said shaft so that the sleeve is freely movable laterally of said shaft to a limited extent, and a pair of latch bolts disposed at opposite sides of said shaft and having axes perpendicular to the axis of the shaft, said latch bolts being movable axiswise toward and away from said shaft and operative conjointly when fully extended toward said shaft to obstruct said sleeve and thereby latch said shaft against movement in one direction, each of said latch bolts being operative when the other only is fully retracted from latching position to deflect said sleeve laterally of said shaft into a position wherein it is unobstructed by either of said latch bolts.

5. Mechanism comprising a shaft which is reciprocable axiswise, a sleeve carried by and encircling said shaft and movable axiswise therewith, said sleeve having an external annular ridge therearound and having a bore of larger diameter than said shaft so that the sleeve is freely movable laterally of said shaft to a limited extent, and a pair of latch bolts disposed at opposite sides of said shaft and having a common axis perpendicular to the axis of the shaft, said latch bolts being individually movable axiswise toward and away from said shaft and being so closely spaced, end to end, when fully extended toward said shaft that they are effective conjointly to hold said sleeve against lateral displacement and at the same time to engage said ridge and thereby obstruct axiswise movement of said sleeve and said shaft in one direction, each of said latch bolts having a sloping surface which is adapted to engage said ridge when the two latch bolts are fully extended toward the shaft and which is effective upon retraction of the other latch bolt to deflect the sleeve into a position wherein it will clear both latch bolts.

6. In combination, a valve including a valve element and having a valve stem for the element which is movable axiswise to open and close the valve, a latching element carried by said valve stem and movable axiswise therewith, said element being movable in opposite directions laterally of said valve stem, a pair of latch bolts disposed at opposite sides of said element and having a common axis extending perpendicularly to the axis of said valve stem, said latch bolts being movable axiswise toward and away from said element and effective when both are fully extended toward said element to latchingly engage said element and to hold said element against lateral displacement in a centralized position with respect to said valve stem so that said element is capable of lateral movement toward either latch bolt which may subsequently be retracted, the arrangement being such that said element is capable of moving laterally to a position in which it will clear both latch bolts whenever one of said latch bolts is fully retracted, said latch bolts being biased toward retracted position, and a pair of fluid-pressure-actuated devices each connected to one of said latch bolts individually and operative when fully energized to hold its latch bolt in latching position.

ALBERT STADLER.

References Cited in the file of this patent

UNITED STATES PATENTS

| Number | Name | Date |
| --- | --- | --- |
| 1,299,850 | MacDonald | Apr. 18, 1919 |
| 1,303,801 | Jones | May 13, 1919 |
| 1,717,692 | Kamedish | June 18, 1929 |
| 1,851,924 | Ramsay | Mar. 29, 1932 |
| 2,081,542 | Kidney | May 25, 1937 |
| 2,327,055 | McMahon | Aug. 17, 1943 |

FOREIGN PATENTS

| Number | Country | Date |
| --- | --- | --- |
| 100,633 | Germany | of 1899 |
| 282,642 | Great Britain | of 1929 |
| 571,635 | France | Feb. 6, 1924 |